United States Patent [19]

Kim

[11] Patent Number: 5,757,969
[45] Date of Patent: May 26, 1998

[54] METHOD FOR REMOVING A BLOCKING EFFECT FOR USE IN A VIDEO SIGNAL DECODING APPARATUS

[75] Inventor: Sang-Ho Kim, Seoul, Rep. of Korea

[73] Assignee: Daewoo Electronics, Co., Ltd., Seoul, Rep. of Korea

[21] Appl. No.: 595,141

[22] Filed: Feb. 1, 1996

[30] Foreign Application Priority Data

Feb. 28, 1995 [KR] Rep. of Korea ............... 95-3964

[51] Int. Cl.[6] ................................................ G06K 9/36
[52] U.S. Cl. ................................................... 382/236
[58] Field of Search ............................ 382/232, 233, 382/236, 239, 248, 256; 348/400, 420, 421, 395, 401, 403; 358/432, 433

[56] References Cited

U.S. PATENT DOCUMENTS

| | | | |
|---|---|---|---|
| 4,205,341 | 5/1980 | Mitsuya et al. | 348/420 |
| 4,677,479 | 6/1987 | Hatori et al. | 382/239 |
| 4,729,021 | 3/1988 | Kondo | 348/421 |
| 4,743,959 | 5/1988 | Frederiksen | 348/421 |
| 4,903,138 | 2/1990 | Aragaki | 348/420 |
| 5,070,402 | 12/1991 | Ishii et al. | 348/421 |
| 5,166,987 | 11/1992 | Kageyama | 382/239 |
| 5,196,931 | 3/1993 | Kondo | 348/420 |
| 5,282,255 | 1/1994 | Bovik et al. | 382/239 |
| 5,327,502 | 7/1994 | Katata et al. | 382/239 |

*Primary Examiner*—Jose L. Couso
*Attorney, Agent, or Firm*—Pennie & Edmonds LLP

[57] ABSTRACT

A method for post-processing a current block is used in a decoding system for decoding an encoded digital image signal. The encoded digital image signal includes a plurality of encoded blocks of quantized transform coefficients, and the current block corresponds to one of the encoded blocks having a quantized DC coefficient and a predetermined number of quantized AC coefficients, the quantized DC coefficient having been quantized based on a DC quantization step size. The method comprises the steps of: (a) obtaining an average current pixel value of current block pixels located along a borderline between the current block and its neighboring blocks; (b) estimating an average pixel value of the pixels in the current block by using variations in pixel values of the pixels in the neighboring blocks to thereby produce an estimated current pixel value; and (c) adjusting pixel values of the pixels in the current block based on the average current pixel value, the estimated current pixel value and the DC quantization step size.

9 Claims, 3 Drawing Sheets

$$MV = \left[\left(\sum_{j=1}^{8} C(I,j) + \sum_{i=1}^{8} C(i,I)\right)/16\right]$$

$$EMV = \left[\left(\sum_{j=1}^{8} U(8,j) + \sum_{i=1}^{8} L(i,8)\right)/16\right] \times 2$$

$$-\left(\sum_{j=1}^{8} U(7,j) + \sum_{i=1}^{8} L(i,7)\right)/16$$

METHOD FOR REMOVING A BLOCKING EFFECT FOR USE IN A VIDEO SIGNAL DECODING APPARATUS

FIELD OF THE INVENTION

The present invention relates to a post-processing method for use in a video signal decoding apparatus; and, more particularly, to a method capable of removing a blocking effect present along a borderline of a block of decoded image signals.

DESCRIPTION OF THE PRIOR ART

In various electronic/electrical applications such as high definition television and video telephone systems, an image signal is usually transmitted in a digitized form, wherein a large amount of digital data is normally generated. Since, however, the available frequency bandwidth of a conventional transmission channel is limited, the image signal is normally compressed to be transmitted therethrough. Among various video compression techniques, the so-called hybrid coding technique, which combines temporal and spatial compression techniques together with a statistical coding technique, is known to be most effective.

Most hybrid coding techniques employ various steps including adaptive intra/inter mode coding, orthogonal transform, quantization of transform coefficients, RLC(run-length coding), and VLC(variable length coding). The intra/inter mode coding is a process of selecting a video signal for a subsequent orthogonal transform thereof from either PCM (pulse code modulation) data of a current frame or DPCM (differential pulse code modulation) data adaptively, e.g., based on a variance thereof. The inter mode coding, also known as a predictive method, which is based on the concept of reducing redundancies between neighboring frames, is a process of determining the movement of an object between a current frame and its one or two neighboring frames, and predicting the current frame according to a motion flow of the object to produce an error signal representing differences between the current frame and its prediction. This coding method is described, for example, in Staffan Ericsson, "Fixed and Adaptive Predictors for Hybrid Predictive/Transform Coding", *IEEE Transactions on Communications*, COM-33, No. 12, pp. 1291–1301 (December 1985); and in Ninomiya and Ohtsuka, "A Motion-Compensated Interframe Coding Scheme for Television Pictures", *IEEE Transaction on Communications*, COM-30, No. 1, pp. 201–210 (January 1982), both of which are incorporated herein by reference.

The orthogonal transform, which exploits spatial correlationships between image data such as PCM data of the current frame or motion compensated DPCM data and reduces or removes spatial redundancies therebetween, converts a block of digital image data into a set of transform coefficients. This technique is described in, e.g., Chen and Pratt, "Scene Adaptive Coder", *IEEE Transactions on Communications*, COM-32, No. 3, pp. 225–232 (March 1984). By quantizing such transform coefficient data, zigzag scanning, RLC and VLC, the amount of data to be transmitted can be effectively compressed.

Encoded image data is transmitted through a conventional transmission channel to an image signal decoder of an image signal decoding apparatus within a receiver, which performs a reverse process of an encoding operation to thereby reconstruct the original image data. However, the reconstructed image data or decoded image data may display an annoying artifact called a blocking effect wherein the borderline of a block becomes noticeable at the receiver. Such blocking effect sometimes occurs due to the fact that a frame is encoded on a block by block basis; and may become more noticeable as the quantization step size becomes larger, i.e., when the blocks undergo more coarse quantization. Especially, if a certain block is much brighter or darker than its adjacent blocks, and, a large quantization step size is used for quantizing the intra-block DC coefficient, intensity differences between that certain block and its adjacent blocks may become even more pronounced, resulting in a more severe blocking effect and deteriorating the quality of the image.

Accordingly, there have been proposed various types of post-processing techniques to reduce the blocking effect, thereby improving the quality of the decoded image data. These post-processing techniques generally employ a post-processing filter for further processing the decoded image data.

In the post-processing technique using the post-processing filter, the decoded image data is filtered on a pixel-by-pixel basis using a low pass filter having a predetermined cutoff frequency. A post-processing technique which adopts the post-processing filter is disclosed in a commonly owned copending application, U.S. Ser. No. 08/431,880, entitled "IMPROVED POST-PROCESSING METHOD FOR USE IN AN IMAGE SIGNAL DECODING SYSTEM". This technique provides an improved performance of reducing the blocking effect along a borderline of a block of decoded image data by repeatedly post-processing it based on respective filtered image data. However, this post-processing technique performs the filtering operation of the decoded image data without considering the position of each pixel contained in the block; and, therefore, it may not be able to reduce the blocking effect completely along the boundary of the block.

SUMMARY OF THE INVENTION

It is, therefore, a primary object of the invention to provide an improved method for removing a blocking effect present along a boundary of a block of decoded image signal by adjusting or harmonizing pixel values of a current block to pixel values of its adjacent neighboring blocks.

In accordance with the invention, there is provided a method for post-processing a current block for use in a decoding system for decoding an encoded digital image signal, wherein the encoded digital image signal includes a plurality of encoded blocks of quantized transform coefficients, and the current block corresponds to one of the encoded blocks having a quantized DC coefficient and a predetermined number of quantized AC coefficients, the quantized DC coefficient having been quantized based on a DC quantization step size, comprising the steps of:

(a) obtaining an average current pixel value of current block pixels located along a borderline between the current block and its neighboring blocks;

(b) estimating an average pixel value of the pixels in the current block by using variations in pixel values of the pixels within the neighboring blocks to thereby produce an estimated current pixel value; and (c) adjusting pixel values of the pixels in the current block based on the average current pixel value, the estimated current pixel value, and the DC quantization step size.

BRIEF DESCRIPTION OF THE DRAWINGS

The above and other objects and features of the present invention will become apparent from the following descrip-

Figure 1:
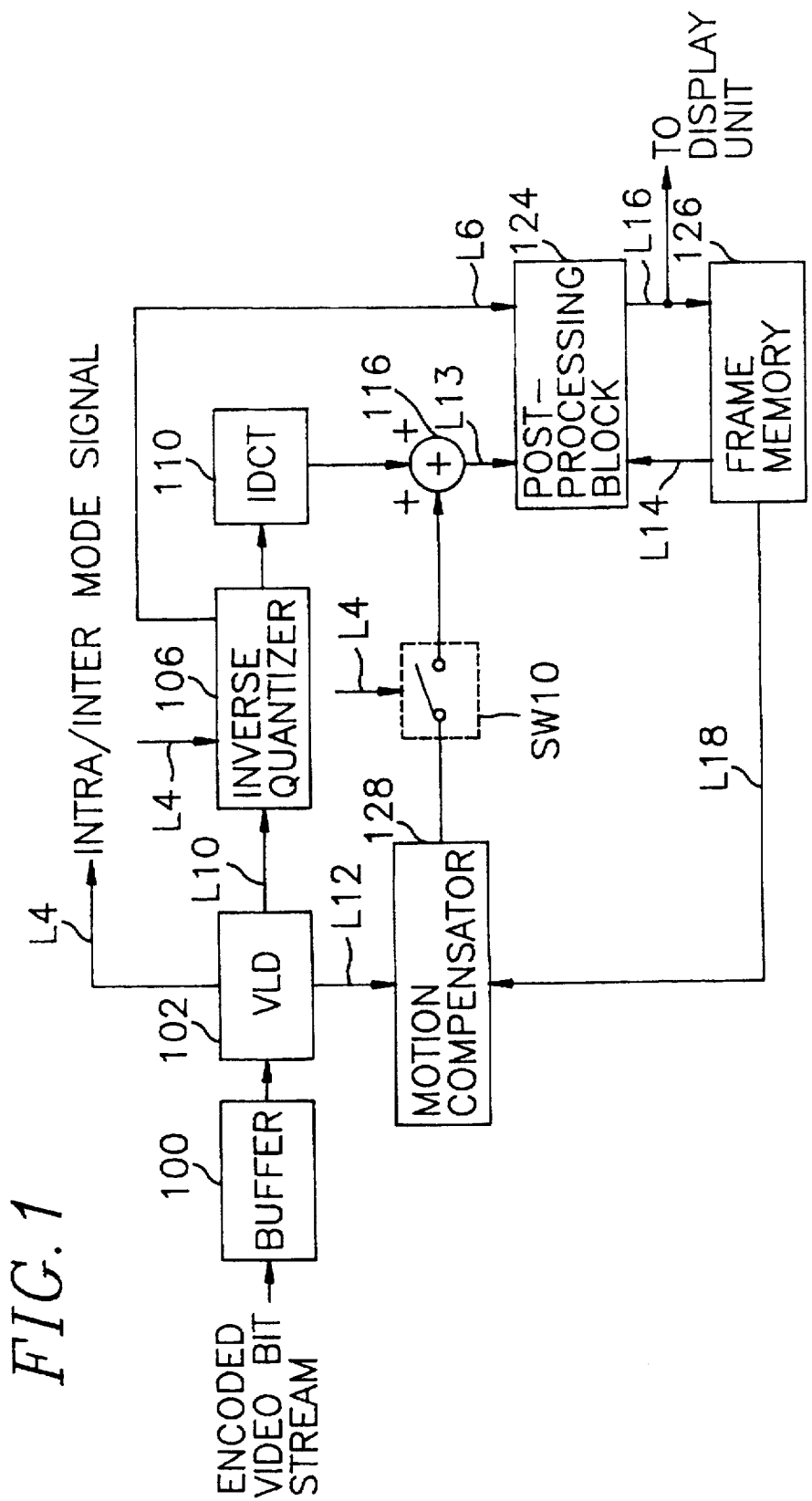
Figure 2:
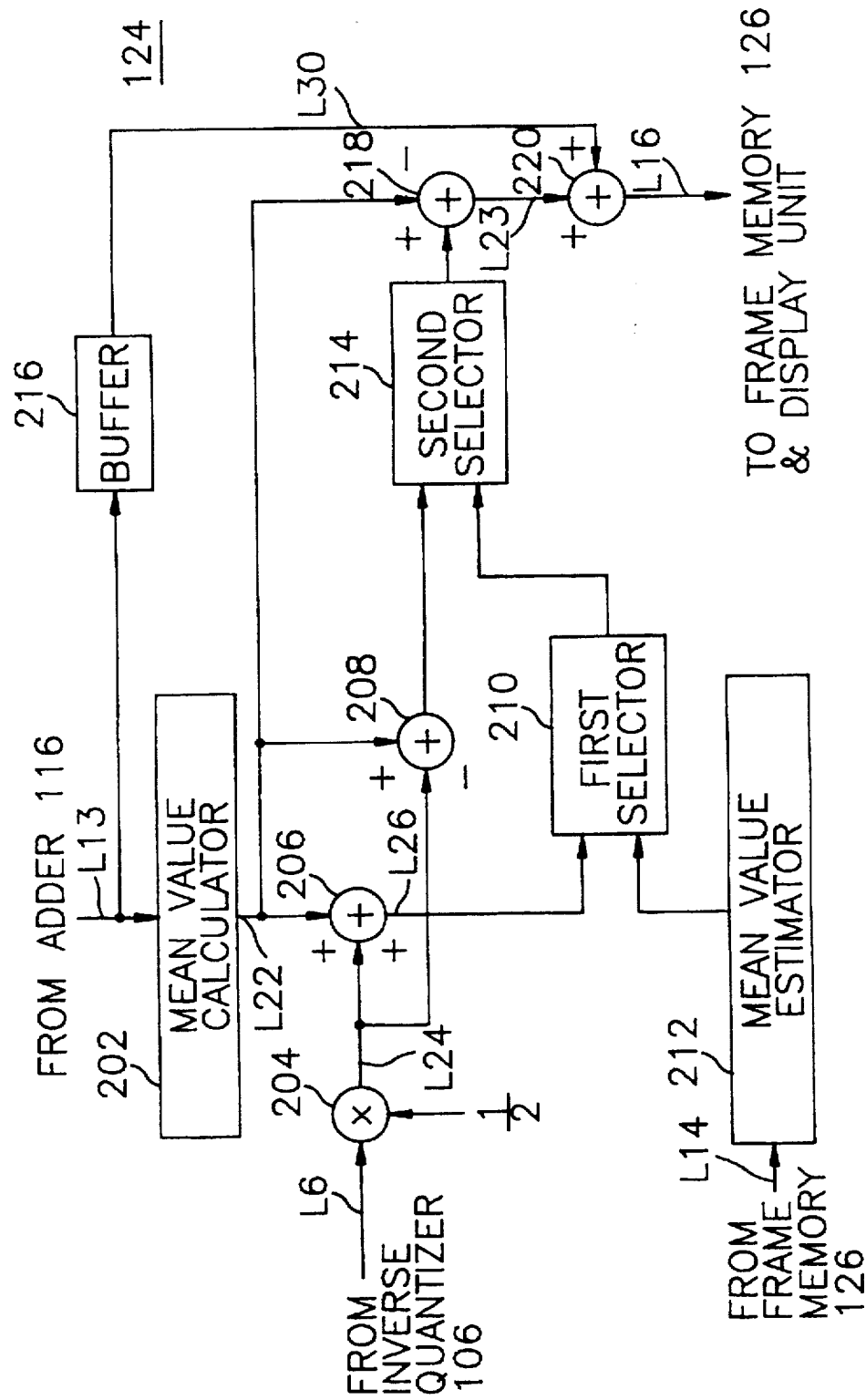
Figure 3A:
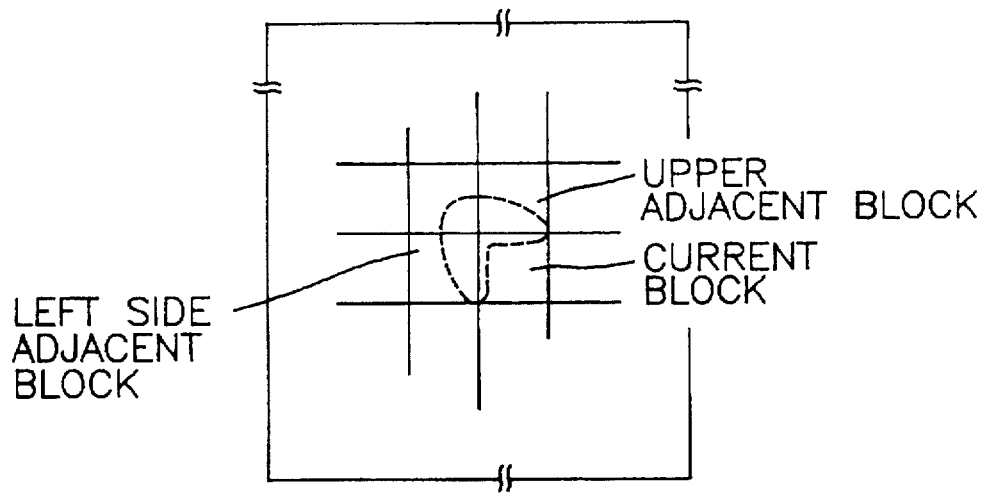
Figure 3B:
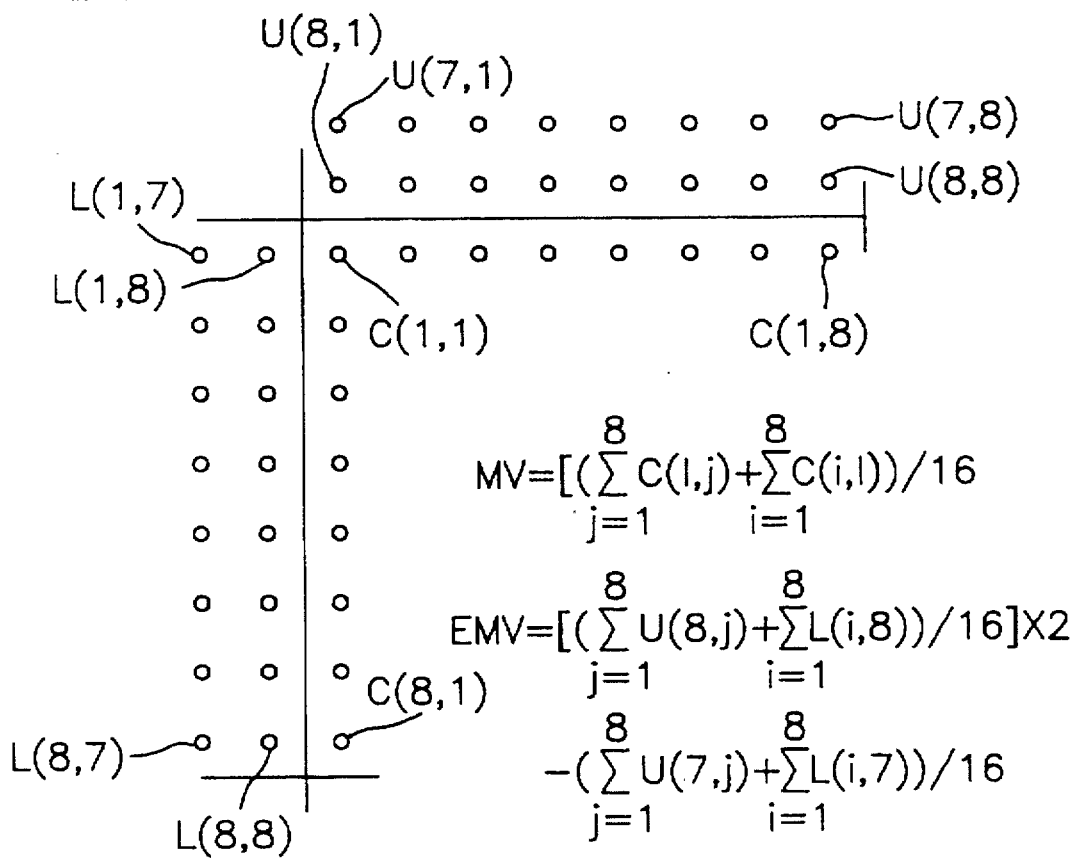

3 tion of preferred embodiments given in conjunction with the accompanying drawings, in which:

FIG. 1 represents a video signal decoding apparatus having a post-processing block for removing a blocking effect in accordance with the present invention;

FIG. 2 describes a detailed block diagram of the post-processing block of FIG. 1; and FIGS. 3A and 3B show an exemplary frame to describe the operation of the post-processing block of FIG. 1.

DETAILED DESCRIPTION OF THE PREFERRED EMBODIMENTS

Referring to FIG. 1, there is shown a preferred embodiment of an encoded video signal decoding apparatus capable of removing a blocking effect in accordance with the present invention. As shown in FIG. 1, an encoded video bit stream is provided from a corresponding conventional encoder(not shown) to the decoding apparatus, in particular, to a buffer 100. The buffer 100 receives the encoded video bit stream and supplies it at a fixed rate to a variable length decoder (VLD) 102.

At the VLD 102, the encoded video bit stream is first demultiplexed to produce an intra/inter mode signal and encoded image data, i.e., a plurality of encoded blocks of quantized transform coefficients and variable-length coded motion vectors, wherein the plurality of encoded blocks of quantized transform coefficients are then decoded to provide a plurality of blocks of quantized transform coefficients(Qfs) and a set of quantization step sizes for each of the blocks to an inverse quantizer 106 via a line L10, while the variable-length coded motion vectors are decoded to provide motion vectors to a motion compensator 128 via a line L12. The Qfs for each of the blocks, e.g., an 8×8 block, include one DC coefficient and 63 AC coefficients, and the set of quantization step sizes may include two kinds of quantization step sizes: one is for the DC coefficient and the other is for the AC coefficients.

At the inverse quantizer 106, a block of Qfs is converted into a set of DCT coefficients using a corresponding set of quantization step sizes determined by the intra/inter mode signal supplied from the VLD 102 via the line L4. Subsequently, the set of DCT coefficients is fed to an inverse discrete cosine transformer(IDCT) 110, and the quantization step size for a DC coefficient is provided to a post-processing block 124.

The IDCT 110 inversely transforms the set of DCT coefficients into a block of IDCT data which is provided to an adder 116.

In the meantime, using the motion vectors from the VLD 102 via the line L12, the motion compensator 128 extracts a block of pixel data corresponding to a block of IDCT data from a previous frame stored in a frame memory 126 via a line L18 and provides the extracted pixel data as motion compensated data to a switch SW10, wherein the motion compensated data is relayed to the adder 116 for its addition to the IDCT data when an inter mode signal is provided via the line L4 thereto, to thereby provide a decoded data signal to the post-processing block 124; and, when an intra mode signal is provided via the line L4, the switch SW10 is set open and the IDCT data from the IDCT 110 is provided through the adder 116 to the post-processing block 124 without any adding operation.

At the post-processing block 124, a blocking effect resulting from noticeable pixel luminance differences between a current block and its neighboring blocks is removed as

4 follows: first, a mean value(MV) of luminances of current block pixels located along a boundary between the current block and its neighboring blocks is calculated; a mean value of luminances of the pixels in the current block is estimated by using variations in pixel values of the pixels in the neighboring blocks to thereby produce an estimated mean value(EMV) of the current block pixels; and subsequently, the mean value and the estimated mean values are compared each other to thereby provide a comparison result; and, finally, all of pixel values of the current block are adjusted based on the comparison result and a DC quantization step size(QS) of the current block. If -QS/2<(MV-EMV)<QS/2, all of the pixel values of the current block are increased by a factor (MV-EMV); if (MV-EMV)≧QS/2, all of the pixel values of the current block are decreased by QS/2; and, if (MV-EMV)≦-QS/2, all of the pixel values, of the current block are increased by QS/2. Details of the post-processing block 124 is described with reference to FIG. 2.

The post-processing block 124 includes a mean value calculator 202 and a mean value estimator 212, a multiplier 204, first and second adders 206 and 220, first and second subtractors 208 and 218, first and second selectors 210 and 214 and a buffer 216. The IDCT data is inputted to the mean value calculator 202 and the buffer 216 from the adder 116 via a line L13. The mean value calculator 202 stores the pixel values of the current block and calculates the MV. Referring to FIG. 3B, an enlarged view of FIG. 3A, the MV, e.g., for an 8×8 block, is calculated as follows:

$$MV = \left( \sum_{j=1}^{8} C(1,j) + \sum_{i=1}^{8} C(i,1) \right) / 16 \qquad \text{Eq. (1)}$$

wherein C(i,j) is a luminance value of a pixel located at an ith row and a jth column in the current block. As shown in Eq. (1), the MV is an average value of the luminance values of the current block pixels located along the boundary between the current block and its neighboring blocks.

On the other hand, all of the pixel values of the upper and the left side adjacent blocks are inputted to a mean value estimator 212 from the frame memory 126 via the line L14 wherein the EMV is calculated. Referring to FIG. 3B, in case the neighboring blocks to the current block are an upper and a left side adjacent blocks, the EMV for the two 8×8 blocks may be calculated as follows:

$$EMV = \left[ \left( \sum_{j=1}^{8} U(8,j) + \sum_{i=1}^{8} L(i,8) \right) / 16 \right] x2 - \qquad \text{Eq. (2)}$$

$$\left( \sum_{j=1}^{8} U(7,j) + \sum_{i=1}^{8} L(i,7) \right) / 16$$

wherein U(i,j) and L(i,j) are luminance values of pixels located at an ith row and a jth column in an upper and a left side adjacent blocks, respectively. As shown in Eq. (2), the EMV is obtained by using variations in pixel values of the pixels within the neighboring blocks.

To adjust the pixel values of the current block based on a difference between the mean value and the estimated mean value, the multiplier 204 multiplies the QS provided from the inverse quantizer 106 by ½ and supplies the result QS/2 to the first adder 206 via a line L24, wherein the first adder 206 adds up the MV from the mean value calculator 202 and QS/2 and provides the result MV+QS/2 to the first selector 210 via the line L26. The first selector 210 selects the smaller of two inputs, i.e., MV+QS/2 and the EMV, and supplies the selected input to the second selector 214. The difference between MV and QS/2 is calculated at the first subtractor 208, and the result MV−QS/2 is provided to the second selector 214. The second selector 214 selects the larger of two inputs, i.e., MV–QS/2 and the selected value from the first selector 210, and provide it to the second subtractor 218. The second subtractor 218 subtracts the MV from the selected value of the second selector 214, resulting in one of QS/2, MV–EMV or –QS/2. At the second adder 220, the result of the second subtractor 218 is added to all the pixel values of the current block delayed at the buffer 216, to produce adjusted pixel values of the current block, which are simultaneously provided to the frame memory 126 and the display unit.

While the present invention has been shown and described with reference to the particular embodiments, it will be apparent to those skilled in the art that many changes and modifications may be made without departing from the spirit and scope of the invention as defined in the appended claims.

What is claimed is:

1. A method for post-processing a current block for use in a decoding system for decoding an encoded digital image signal, wherein the encoded digital image signal includes a plurality of encoded blocks of quantized transform coefficients, and the current block corresponds to one of the encoded blocks having a quantized DC coefficient and a predetermined number of quantized AC coefficients, the quantized DC coefficient having been quantized based on a DC quantization step size (OS), comprising the steps of:

(a) obtaining an average current pixel value (ACV) of current block pixels located along a borderline between the current block and its neighboring blocks;

(b) estimating an average pixel value of the pixels in the current block by using variations in pixel values of the pixels in the neighboring blocks to thereby produce an estimated current pixel value (ECV); and (c) adjusting pixel values of the pixels in the current block based on the average current pixel value, the estimated current pixel value and the DC quantization step size, wherein said adjusting step (c) includes the steps of:
   (c1) subtracting the ECV from the ACV; and
   (c2) if (ACV-ECV)≧QS/2, decreasing all the pixel values of the current block by QS/2; if (ACV-ECV) <–QS/2, increasing all the pixel values of the current block by QS/2; and, if –QS/2 <(ACV–ECV)≦QS/2, increasing all the pixel values of the current block by ACV-ECV.

2. The method as recited in claim 1, wherein the neighboring blocks to the current block represent an upper and a left side adjacent blocks.

3. The method as recited in claim 2, wherein the estimated current pixel value (ECV) is calculated as follows:

$$ECV = \left[ \left( \sum_{j=1}^{8} U(8,j) + \sum_{i=1}^{8} L(i,8) \right) / 16 \right] \times 2 -$$

$$\left( \sum_{j=1}^{8} U(7,j) + \sum_{i=1}^{8} L(i,7) \right) / 16$$

wherein U(i,j) and L(i,j) are pixel values of the pixels located at an ith row and a jth column in the upper and the left side adjacent blocks, respectively.

4. A method for post-processing a current block for use in a decoding system for decoding an encoded digital image signal, wherein the encoded digital image signal includes a plurality of encoded blocks of quantized transform coefficients, and the current block corresponds to one of the encoded blocks having a quantized DC coefficient and a predetermined number of quantized AC coefficients, the quantized DC coefficient having been quantized based on a DC quantization step size(OS), comprising the steps of:

(a) obtaining a mean value(MV) for a first set of pixel values of current block pixels located along a borderline between the current block and its neighboring blocks;

(b) calculating variations in a second set of pixel values of the pixels in the neighboring blocks to produce an estimated mean value (EMV) for the first set of pixel values of the current block pixels wherein the estimated mean value (EMV) represents an average value estimated from the variations; and (c) adjusting pixel values of the pixels in the current block based on the mean value(MV), the estimated mean value CMV) and the DC quantization step size, wherein said adjusting step (c) includes the steps of:
   (c1) subtracting the EMV from the MV; and
   (c2) if (MV–EMV)≧–QS/2, decreasing all the pixel values of the current block by QS/2; if (MV–EMV) <–QS/2, increasing all the pixel values of the current block by QS/2; and, if –QS/2<(MV–EMV)<QS/2, increasing all the pixel values of the current block by MV–EMV.

5. A method for post-processing a current block for use in a decoding system for decoding an encoded digital image signal, wherein the encoded digital image signal includes a plurality of encoded blocks of quantized transform coefficients, and the current block corresponds to one of the encoded blocks having a quantized DC coefficient and a predetermined number of quantized AC coefficients, the quantized DC coefficient having been quantized based on a DC quantization step size(OS), comprising the steps of:

(a) obtaining a mean value(MV) for a first set of pixel values of current block pixels located along a borderline between the current block and its neighboring blocks:

(b) calculating variations in a second set of pixel values of the pixels in the neighboring blocks to produce an estimated mean value (EMV) for the first set of pixel values of the current block pixels, wherein the estimate mean value (EMV) represents an average value estimated from the variations: and (c) adjusting pixel values of the pixels in the current block based on the mean value(MV), the estimated mean value (EMV) and the DC quantization step size, wherein the neighboring blocks to the current block represent an upper and a left side adjacent blocks, and wherein the estimated mean value (EMV) is calculated as follows:

$$EMV = \left[ \left( \sum_{j=1}^{8} U(8,j) + \sum_{i=1}^{8} L(i,8) \right) / 16 \right] \times 2 -$$

$$\left( \sum_{j=1}^{8} U(7,j) + \sum_{i=1}^{8} L(i,7) \right) / 16$$

wherein U(i,j) and L(i,j) are pixel values of the pixels located at an ith row and a jth column in the upper and the left side adjacent blocks, respectively.

6. A method for countering a blocking effect in a digital image signal, said digital image signal comprising a plurality of non-overlapping blocks and said blocking effect occurring along a borderline of a current block and its neighboring blocks, at least one pixel value in the current block having been quantized with quantization step size of OS, said method comprising the steps of:

(a) calculating a mean value (MV) of a plurality pixels in the current block, said plurality of pixels in the current block being located along the borderline of the current block and its neighboring blocks;

(b) calculating an estimated mean value (EMV) for said plurality of pixels in the current block, based entirely on pixels in its neighboring blocks;

(c) adjusting the pixel values of said plurality of pixels in the current block based solely on MV, EMV and QS, wherein said adjusting step (c) comprises the steps of:

(c1) forming the difference (MV - EMV); and (c2) if (MV-EMV) >QS/2, decreasing all the pixel values of the current block by QS/2; if (MV-EMV) <-QS/2, increasing all the pixel values of the current block by QS/2; and, if -QS/2 <(MV-EMV) <QS/2, increasing all the pixel values of the current block by (MV-EMV).

7. A method for countering a blocking effect in a digital image signal, said digital image signal comprising a plurality of non-overlapping blocks and said blocking effect occurring along a borderline of a current block and its neighboring blocks, at least one pixel value in the current block having been quantized with quantization step size of QS, said method comprising the steps of:

(a) calculating a mean value (MV) of a plurality pixels in the current block, said plurality of pixels in the current block being located along the borderline of the current block and its neighboring blocks;

(b) calculating an estimated mean value (EMV) for said plurality of pixels in the current block, based entirely on pixels in its neighboring blocks;

(c) adjusting the pixel values of said plurality of pixels in the current block based solely on MV, EMV and QS, wherein only two neighboring blocks are used, a first neighboring block situtated above the current block, and a second neighboring block situated to the left of the current block, said plurality of pixels in the current block comprise all pixels in the current block located along the borderline with said first and second neighboring blocks, and the current block and the first and second neighboring blocks all have a block size of 8×8 pixels, and the estimated mean value (EMV) is calculated as follows:

$$EMV = \left[ \left( \sum_{j=1}^{8} U(8,j) + \sum_{i=1}^{8} L(i,8) \right) / 16 \right] x2 - \left( \sum_{j=1}^{8} U(7,j) + \sum_{i=1}^{8} L(i,7) \right) / 16$$

wherein U(i,j) and L(i,j) are pixel values of the pixels located at an ith row and a jth column in the first and the second neighboring blocks, respectively.

8. The method of claim 7, wherein, in step (b), all of said pixels in the neighboring blocks upon which said EMV is based, are either immediately adjacent to the borderline between the current block and the neighboring blocks, or one pixel away from the borderline.

9. The method of claim 8, wherein the EMV is based on a weighted difference between pixels immediately adjacent to the borderline, and pixels one pixel away from the borderline, said pixels immediately adjacent to the borderline having greater weight.

* * * * *